Sept. 26, 1961   V. E. CARBONARA   3,001,289
AUTOMATIC NAVIGATOR
Filed Dec. 19, 1950   8 Sheets-Sheet 1

INVENTOR.
VICTOR E. CARBONARA
BY Myron J. Seibold
ATTORNEY.

Sept. 26, 1961     V. E. CARBONARA     3,001,289
AUTOMATIC NAVIGATOR

Filed Dec. 19, 1950                                         8 Sheets-Sheet 4

INVENTOR.
VICTOR E. CARBONARA
BY Myron J Seibold
ATTORNEY.

*INVENTOR.*
VICTOR E. CARBONARA
BY
*ATTORNEY.*

INVENTOR.
VICTOR E. CARBONARA
BY
ATTORNEY.

Sept. 26, 1961
V. E. CARBONARA
3,001,289
AUTOMATIC NAVIGATOR
Filed Dec. 19, 1950
8 Sheets-Sheet 7
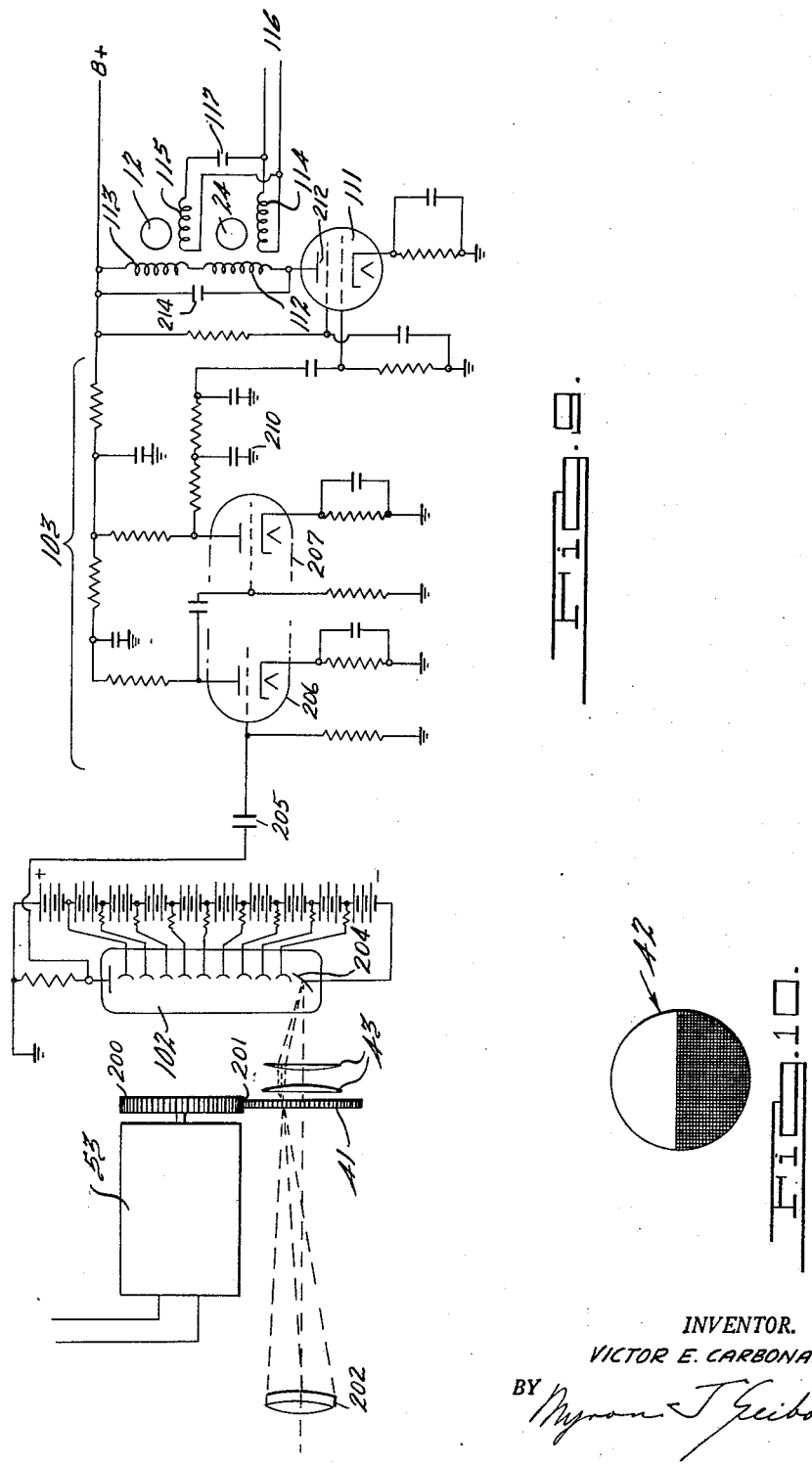
INVENTOR.
VICTOR E. CARBONARA
BY
ATTORNEY.

Sept. 26, 1961 V. E. CARBONARA 3,001,289
AUTOMATIC NAVIGATOR
Filed Dec. 19, 1950 8 Sheets-Sheet 8
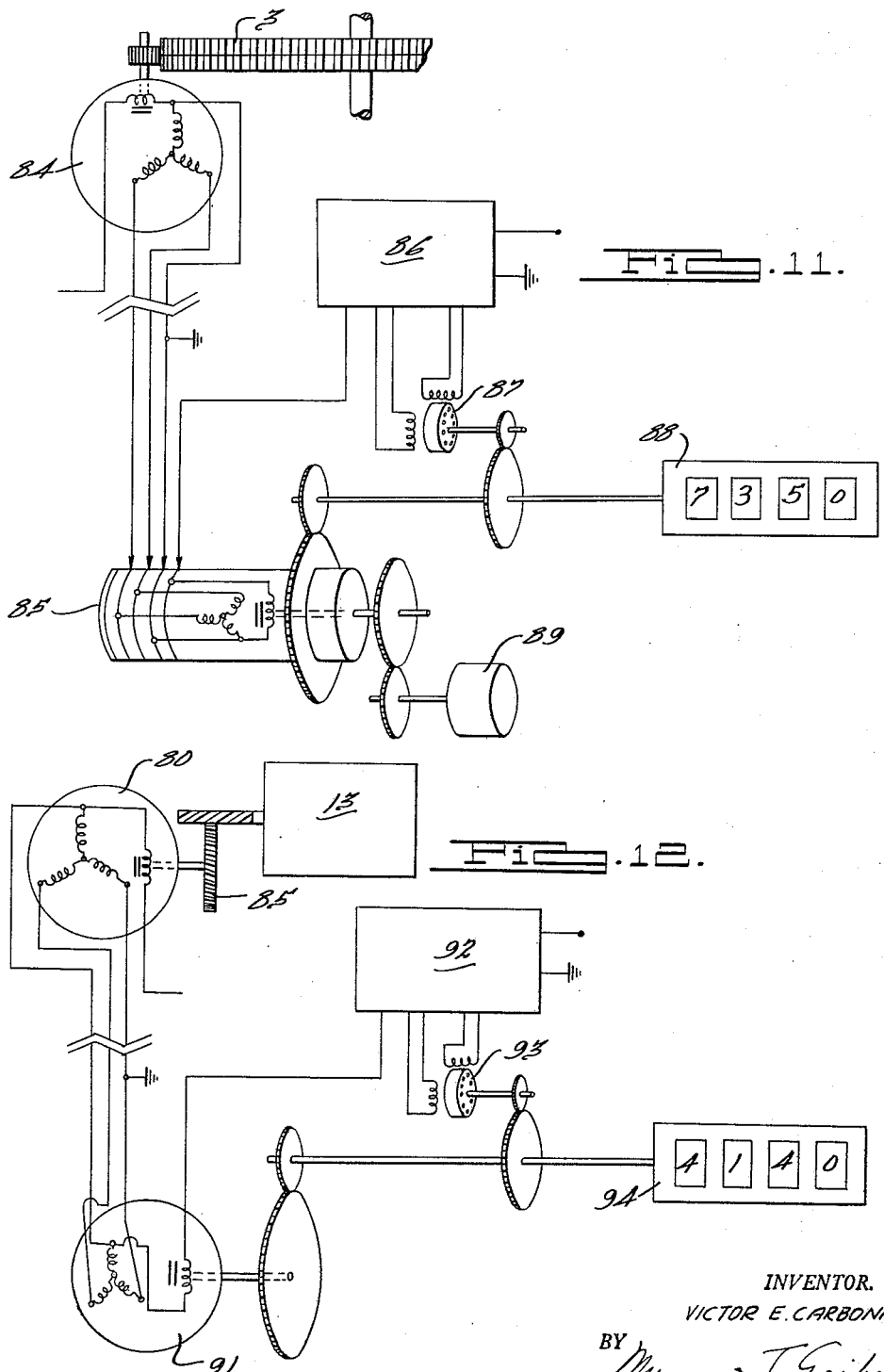
INVENTOR.
VICTOR E. CARBONARA
BY Myron J. Geibold
ATTORNEY.

3,001,289
Patented Sept. 26, 1961

1

3,001,289
AUTOMATIC NAVIGATOR
Victor E. Carbonara, Manhasset, N.Y., assignor to Kollsman Instrument Corporation, Elmhurst, N.Y., a corporation of New York
Filed Dec. 19, 1950, Ser. No. 201,581
4 Claims. (Cl. 33—61)

This invention relates to an automatic navigation instrument for use in moving vehicles such as air or sea craft and more particularly to an automatic star following device through which a continuous indication of longitude and latitude of the moving vehicle may be derived.

The object of the present invention is to provide a means for automatically combining the coordinates of azimuth and elevation of a plurality of celestial bodies with the proper indication of hour angle in order to derive a continuous movement responsive to or an indication of both longitude and latitude.

An object of the invention is the provision of an automatic navigation instrument which fixes the position of a plurality of rigidly connected telescopes in space by their relation to a plurality of celestial points of reference and combines the position with a local horizontal and a local hour angle to provide a response governed by both the longitude and latitude of the instrument.

Another object of the invention is the provision of an automatic navigation instrument including a platform, in fact or in effect fixed in space by the direction of a plurality of telescopes mounted on said platform toward a plurality of celestial points of reference constituted by sources of radiant energy, together with a local horizontal correlated with the angle of said platform about the east-west axis to give a latitude response and with a means operated by local hour angle and correlated with the angle of said platform about the north-south axis to give a longitude response.

A further object of the present invention in accordance with the preceding object is the provision of a means for deriving a continuous indication of longitude and latitude by developing latitude from the comparison of the elevation of a substantially fixed celestial body with the local vertical and by developing longitude from the comparison of local hour angle and the azimuth bearing of a second celestial body having an apparent rotation about the first celestial body.

A further object of the present invention is the provision of a means for deriving a local vertical to which the elevation of a celestial body may be compared in order to derive a true indication of latitude.

A further object of the invention is an automatic navigation instrument including a plurality of telescopes positionable in elevation and azimuth so as to follow a plurality of celestial points of reference so that said telescopes and directly associated elements become fixed in space regardless of the movement of the craft on which the instrument is mounted together with means providing a local horizontal to which the elevation of said telescopes is compared to provide a response governed by the latitude of the instrument and means operated by local hour angle and combining with the azimuth of the telescopes to provide a response governed by the longitude of the instrument.

Further objects and features of the invention will be readily apparent to those skilled in the art from the specification and appended drawings illustrating certain preferred embodiments in which:

FIGURE 9 is a schematic representation of the light sensitive scanning system controlling the operating motors of the navigator motor control and its associated amplifiers.

FIGURE 10 is a view of a shutter disc used in the navigator and scanning system.

FIGURE 11 is a schematic representation of the longitude counter and resolving unit of the present invention.

FIGURE 12 is a schematic representation of the latitude counter and resolving unit of the present invention.

*Principles of operation*

Figure 1:
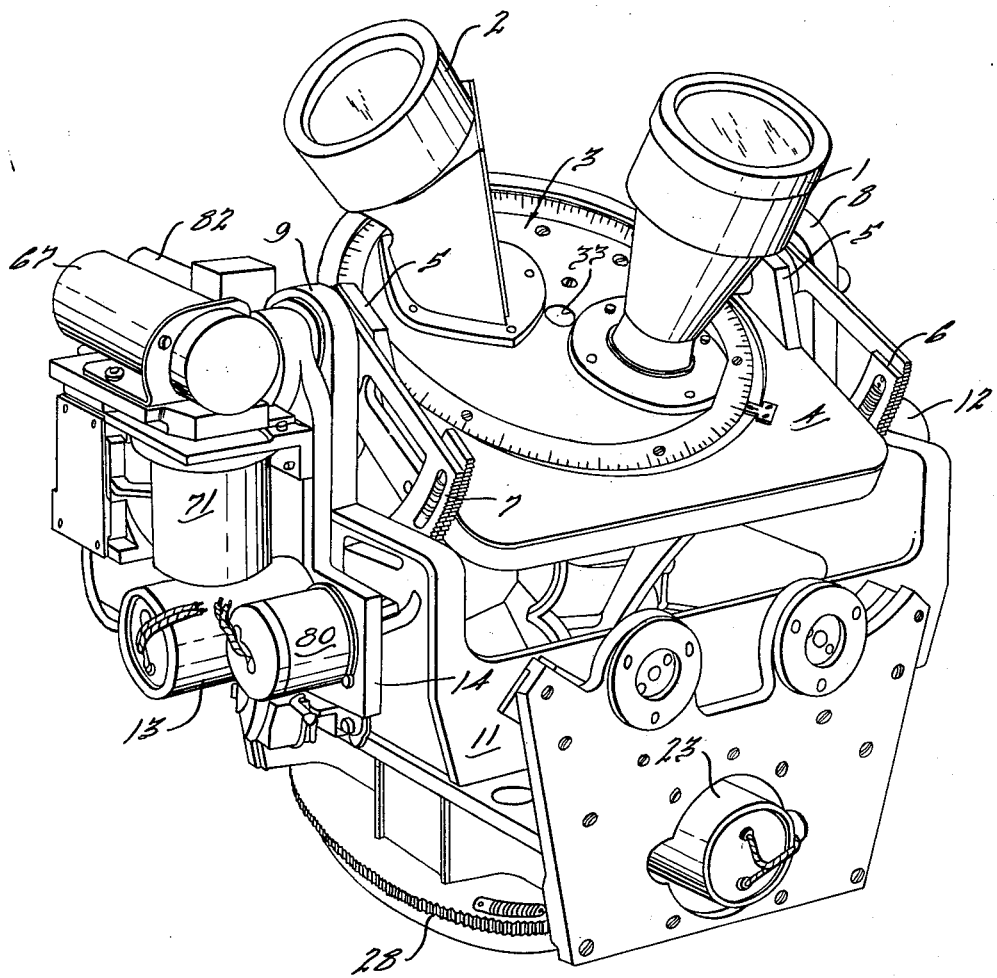
FIGURE 1 is a perspective view of the automatic navigator of the present invention with the telescope platform tilted with respect to the support.

Coordinates of geographical position are derived from the earth's rotational, or polar, axis; longitude being measured from a half plane passing through Greenwich and both poles, which establishes the Greenwich Meridian; and latitude from a plane normal to that axis at the earth's center, which establishes the equator. For navigational purposes, the stars may be considered to be in fixed positions in the celestial sphere, the coordinates of their positions being similar to those used for establishing geographical position.

The projection of the geographical plane establishing the equator onto the celestial sphere establishes the equinoctial and the sun's path within the celestial sphere as it crosses the equinoctial establishes the vernal and autumnal equinox, the vernal equinox being the spring time crossing of the sun over the equinoctial for this hemisphere and the autumnal being the fall crossing. The vernal equinox and the equinoctial are then used as bases from which to measure sidereal hour angle and declination which correspond to celestial longitude and latitude respectively. The rotation of the earth causes the sidereal hour angle reference coordinates to rotate relative to the geographical longitude at a constant rate, a complete cycle being a sidereal day. The angular relation between the two coordinate systems, i.e. the geographical and celestial, is continuously indicated by a clock giving Greenwich sidereal time which, when measured in degrees of arc, is known as the Greenwich hour angle of the vernal equinox.

Any instantaneous position of the earth within the celestial sphere may be simulated by a mechanism rotatable about suitably related axes. A pointer mounted on a plane normal to itself is directed toward the north celestial pole, thus aligning itself in parallel with the polar axis, the plane on which it is mounted being parallel to the equator. A second pointer mounted at a suitable angle from the polar axis is directed toward a second point on the celestial sphere. As long as the two pointers are continually directed toward these fixed points in space the plane will remain parallel with the equator and will not rotate with the rotation of the earth. It will thus remain rigidly oriented in space.

In practice, the pointers are aligned on two stars, one of which, in the Northern Hemisphere, may conveniently be Polaris which lies almost on the celestial pole and thus conveniently aligns the polar pointer. (A deviating prism is, in practice, employed to direct light from Polaris parallel to the polar axis.) Any other suitably located bright star in the Northern Hemisphere may be used as the target for the second pointer to give the system the necessary spatial stability. Obviously, if tracking telescopes, as described in a copending application of Howard J. Eckweiler for "Scanning System," Serial No. 95,768, filed May 27, 1949, which issued July 12, 1955 as Patent No. 2,713,134, are substituted for the pointers, fixed spatial orientation will be automatically maintained.

It will be understood that any two or more celestial points of reference may be utilized with a corresponding number of telescopes so that a greater reliability and field of use will be provided for the event certain of the stars are obscured by the instrument's position.

The above discussion contemplates a geographically fixed and rigid base for the telescope assembly. In practice, however, the assembly will be on a moving air or sea craft, and must, therefore, be capable of rotation in relation to the craft in which it is mounted. Assume, first that a grounded airplane is free to rotate, which rotation may be resolved about three mutually normal axes. Movements of the craft in altitude and azimuth can be compensated by the Polaris telescope's tracking mechanism about these axes. The whole assembly is supported on an azimuth shaft around which the Polaris telescope is free to maintain its northern orientation regardless of the motion of the aircraft about that axis. An axis normal to the azimuthal axis, and supported thereon, is consequently maintained approximately in an east-west direction and serves for tracking Polaris in altitude.

The third axis of rotation of the airplane is about the axis normal to the azimuthal and east-west axes. Motion around the polar axis by the second telescope does not compensate for this rotation, since, except at the geographical equator, the two axes do not coincide. However, when observed from a geographically fixed base, travel of the star along its diurnal circle about the polar axis is at a constant rate, and therefore, the second star could be followed around the polar axis by a clock-work mechanism. The tracking mechanism of the second telescope may then be used for stabilizing the star-following assembly about the third axis of the base.

The celestial coordinates having been established, the location of geographical position requires only the determination of the local vertical which is provided by a gravity-seeking device. The angular relation of the equator to the zenith, or local vertical, is latitude. Similarly, longitude may be deduced from the angle between the meridian of the zenith and that of the second star.

With the automatic navigator mounted on a geographically fixed base, the direction of the vertical, of course, will not change. When, however, the base moves in a north-south direction, the vertical will show a different orientation with respect to the polar telescopic axis. The instantaneous angular relation between the vertical and the equatorial plane indicates latitude.

If the system is not moved in an east-west direction, the angular relationship between the zenith and the vernal equinox in the celestial sphere is changing only as the earth rotates, and the clockwork mechanism mentioned above is adequate for the proper orientation of the system about the polar axis. However, if the base is moved in an east-west direction, the direction of the zenith changes with relation to the vernal equinox at a rate which differs from the advance of sidereal time, displacing the vertical. The angular relationship between the position of the vertical and the second star is one from which the local hour angle of the vernal equinox may be deduced. The difference between this angle and the Greenwich hour angle of the vernal equinox is longitude.

In the final mechanization of the automatic navigator of this invention, no clockwise is required to drive the telescopic assembly around the polar axis. In stabilizing the system on the second star, the second telescope rotates the whole system including the vertical reference assembly about the third axis. In correcting for the resulting deviation, the vertical reference actuates a motor which drives the telescopic assembly around its polar axis and forces the second telescope to recorrect about the third axis, thereby restoring the vertical reference. By this indirect action, the proper alignment of the telescopic assembly and the vertical reference assembly is maintained. The clockwork is then remotely placed and the local hour angle of the vernal equinox, as taken from the hour angle gear, is compared with the Greenwich hour angle on the clock. The differential between the two is transmitted to a counter where it appears as longitude.

*Description*

As shown in FIGURE 1, the automatic navigator of the present invention has mounted on the top of an hour angle gear plate 3 two seeking telescopes: telescope 1 which is oriented to seek Polaris, and telescope 2 which seeks a second star of strength comparable to Polaris such as Capella. Any desired number of telescopes greater than one seeking any of the stars of sufficient magnitude for instrument response may be utilized in the navigator. The line of sight of each telescope is mechanically related to the supporting plate, the other telescope and the particular star it is to seek in the operation of the instrument. The hour angle gear 3 is mounted in a frame 4 which provides support for the associated light sensitive mechanism later to be described and has a pair of supporting hubs 5 rigidly secured to a pair of hollow rotatable shafts 44.

Shafts 44 are rotatably mounted in bearings 48 on trunnions 8 and 9 in the opposite sides of a cradle 11. The cradle 11 is mounted for rotation about an axis at right angles to axis of rotation of the shafts 44 by means of a pair of arcuate races 15 at opposite sides of the cradle other than the sides on which the trunnions 8 and 9 are located, the races 15 cooperating with and being supported by a pair of stationary races 16 through a plurality of spaced ball bearings 17. The races 16 are mounted in a lower outer cradle 18. On the cradle 18 above the races 16 are mounted a pair of retainer wheels 21 upon stationary shafts 19. The outer cradle 18 is rotatably mounted through the bearings 26 and 27 upon a central stationary shaft 25 secured in the instrument mounting plate 29. A stationary gear ring 28 is rigidly secured to the mounting plate and has gear teeth at its periphery meshing with teeth of a pinion gear driven by a motor 24, the pinion and motor being supported upon the outer cradle 18 so that rotation of the motor is accompanied by rotation of the cradle 18 and the parts mounted thereon in azimuth about the central shaft 25. An azimuth scale and reference, one suitably mounted on the cradle 18 and the other fixed with respect to the mounting plate 29, provide for a setting or reading of the azimuth of the instrument.

Mounted on the cradle 11 between and parallel to the races 15 is a geared sector 22. A motor 23 is mounted in the outer cradle 18 and drives a pinion which meshes with the teeth on the gear sector 22 to effect rotation of the cradle 11 about an axis of rotation passing through the centers of development of the races 15, 16.

Figure 2:
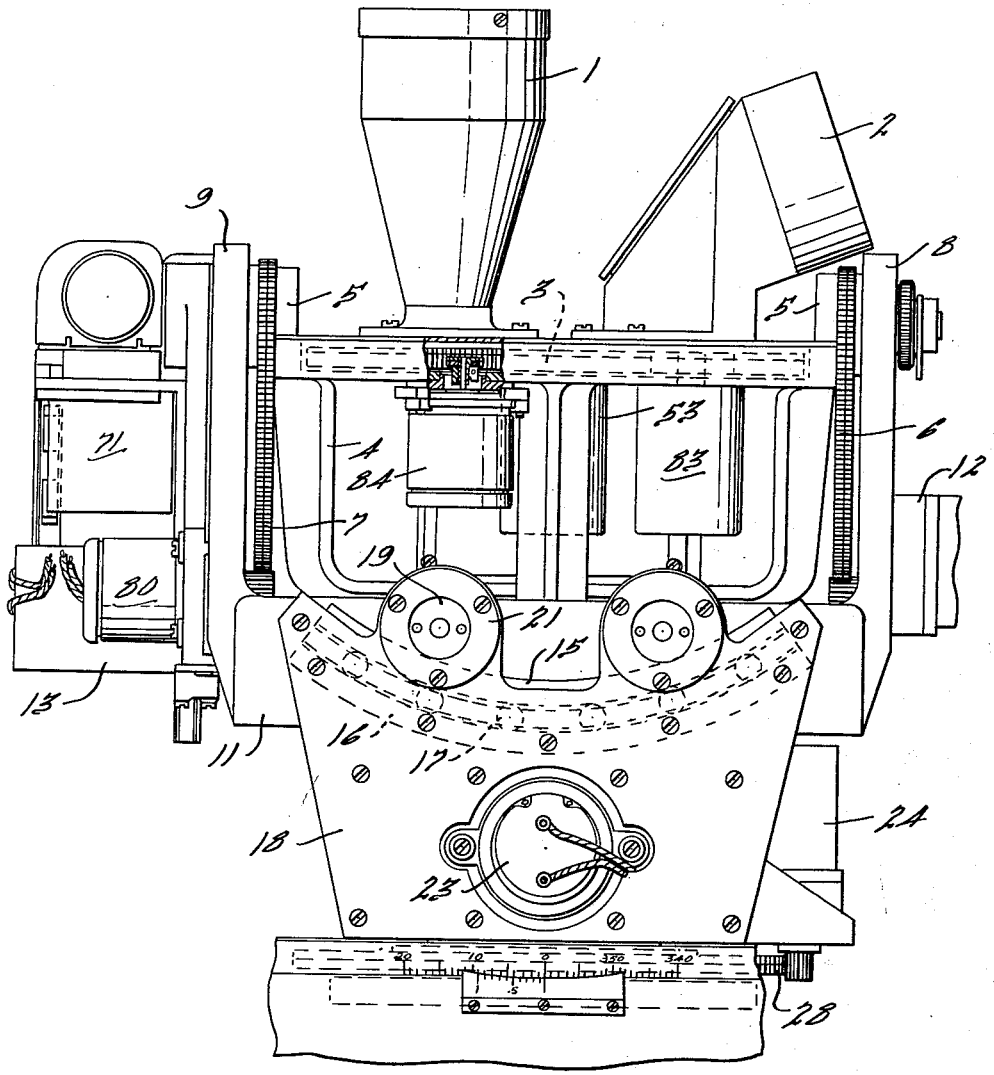
FIGURE 2 is an elevational view of the navigator with the telescope platform parallel to the support and with parts shown in section.

Rigidly mounted upon the shaft 44 at the right of the instrument, as viewed in FIGURES 1 and 2, is a geared sector 6 which meshes with a geared pinion driven by the motor 12 mounted upon the cradle 11. Rotation of the motor 12 is accompanied by rotation of the frame 4 and elements mounted therein about the axis of rotation of the shafts 44. Rigidly mounted upon the shaft 44 at the left of FIGURES 1 and 2 is a gear sector 7 which meshes with a pinion driven by a motor 13 mounted upon frame 14 which carries the horizontal reference to be hereinafter described, the pinion on motor 13 passing freely through an opening in the side of the cradle 11 adjacent thereto. Movement of the frame 14 will, as subsequently described, be determined by the differential rotation between the sector 7 and the pinion driven by the motor 13.

Figure 4:
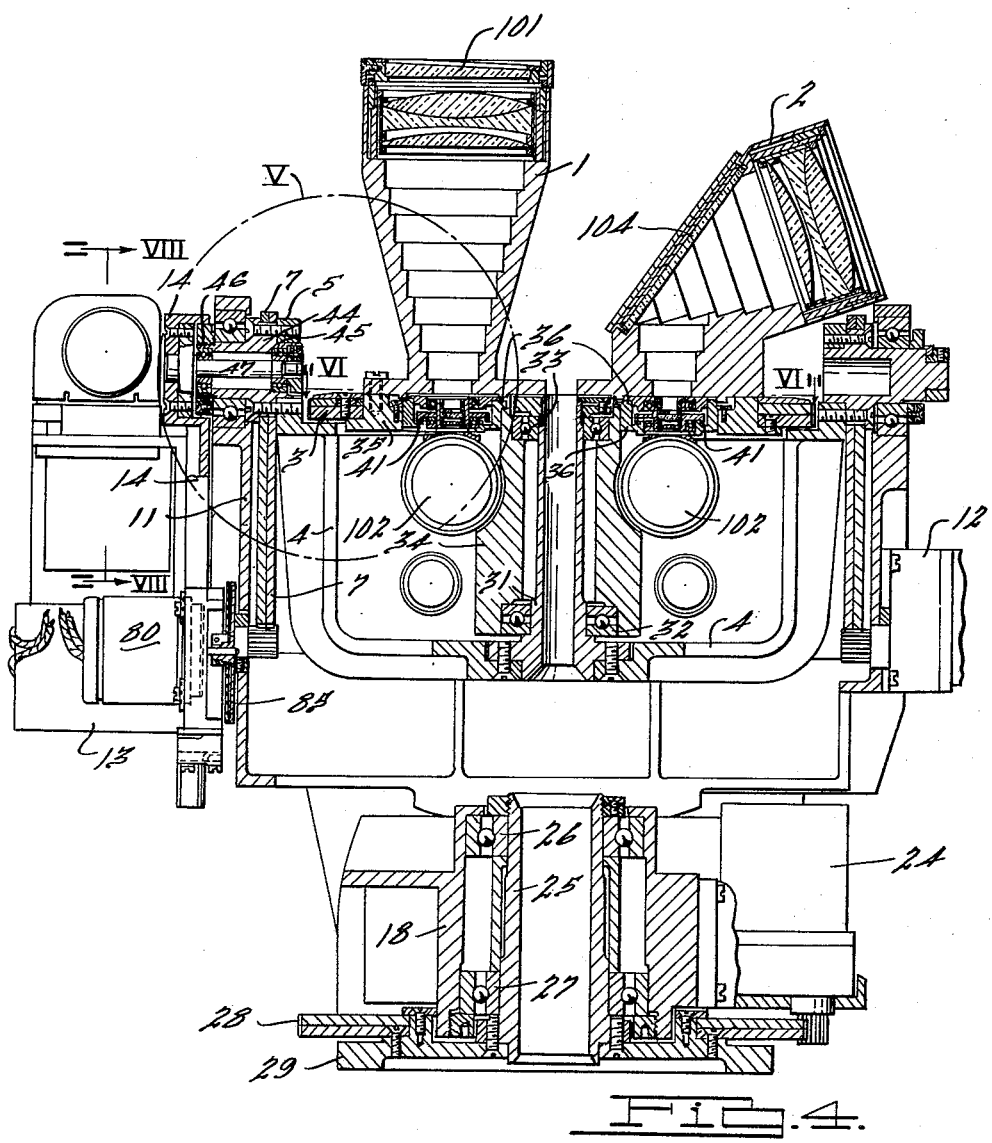
FIGURE 4 is a vertical sectional view along the line IV—IV of FIGURE 3.

Shown in cross-section in FIGURE 4 is the mounting arrangement of the hour angle gear 3 upon which the two telescopes, Polaris 1 and Capella 2, are mounted. A central supporting post 31 is secured to the frame 4, as shown, and rotatably mounts the supporting sleeves 34 by bearings 32 and 33, sleeves 34 being integral with the top support plate 35. Plate 35 carries the hour angle gear at its periphery and they together form the hour angle gear plate 3.

Figure 5:
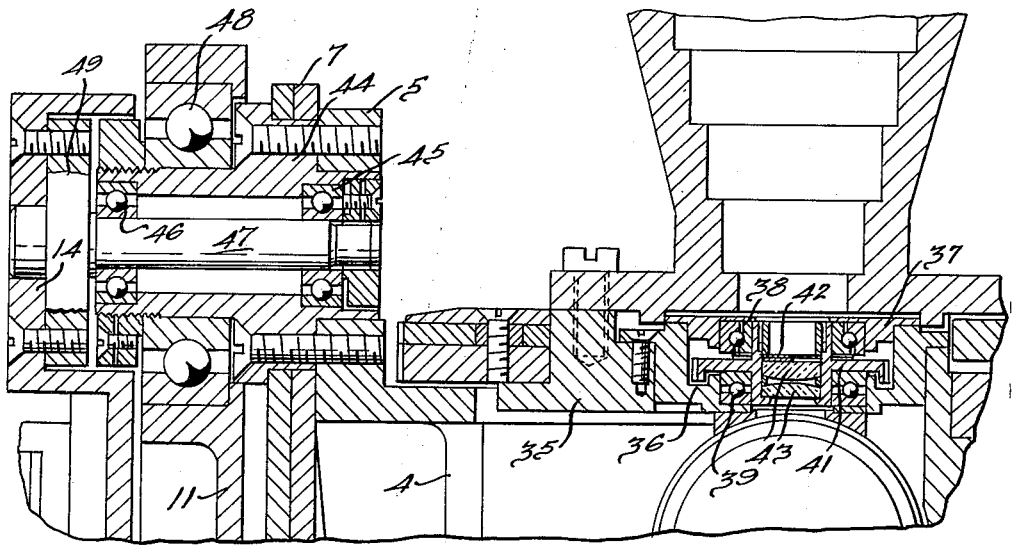
FIGURE 5 is an enlarged sectional view of the portion of FIGURE 4 enclosed in area V.

As more particularly shown in FIGURES 4 and 5, the telescopes 1 and 2 are removably mounted upon the top support plate 35 by means of studs and beneath the lines of sight passing through the telescopes are mounted cup-like supports 36, within each of which is rotatably mounted a shutter holder 41 mounting a shutter 42 and a lens system 43 in accordance with the disclosure of the aforesaid copending application. The holder 41 is rotatably mounted through bearings 38 and 39 and the parts are maintained assembled in the cup-shaped support 36 by a cover plate 37. Beneath the shutters 32 are mounted the phototubes 102 upon which light rays from the stars passing through the shutter 32 are focused by the lens system 43.

Figure 7:
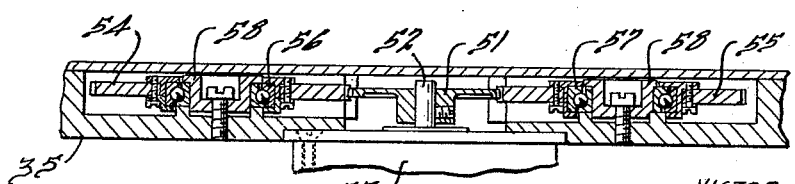
FIGURE 7 is a vertical sectional view of the telescope shutter operating mechanism taken along the lines VII—VII of FIGURE 6.
Figure 6:
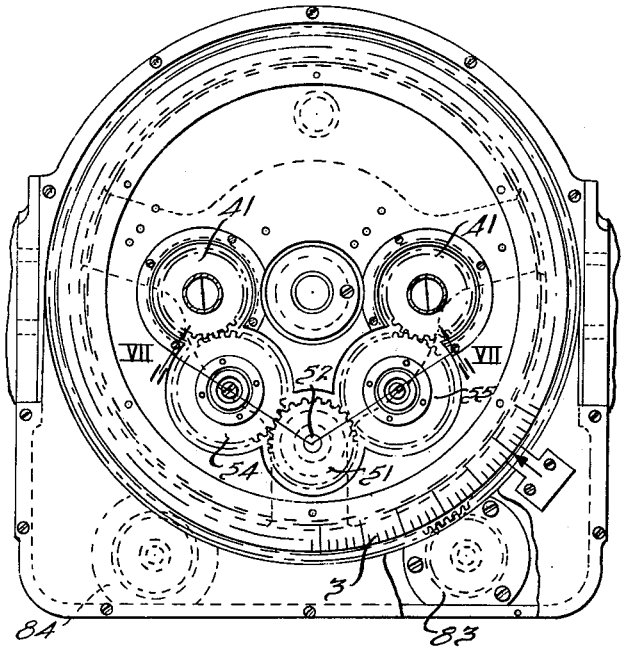
FIGURE 6 is a sectional view of the telescope shutter mechanisms taken along the lines VI—VI of FIGURE 4.

In FIGURES 6 and 7 is shown the drive mechanism provided for the operation of the shutters 42. In FIGURE 6 is shown a shutter drive gear 51 which is mounted on the end of a shaft 52 of a telescope shutter drive motor 53 mounted on the plate 35. The shutter drive gear 51 meshes with two idler gears 54 and 55 which mesh with the shutter holders 41. The arrangement of driving and idler gears is shown in detail in FIGURE 7 wherein the idler gears 54 and 55 are shown as rotatably mounted on the plate 35 by bearings 56 and 57 secured to the supporting plate 35 by hubs 58.

Figure 8:
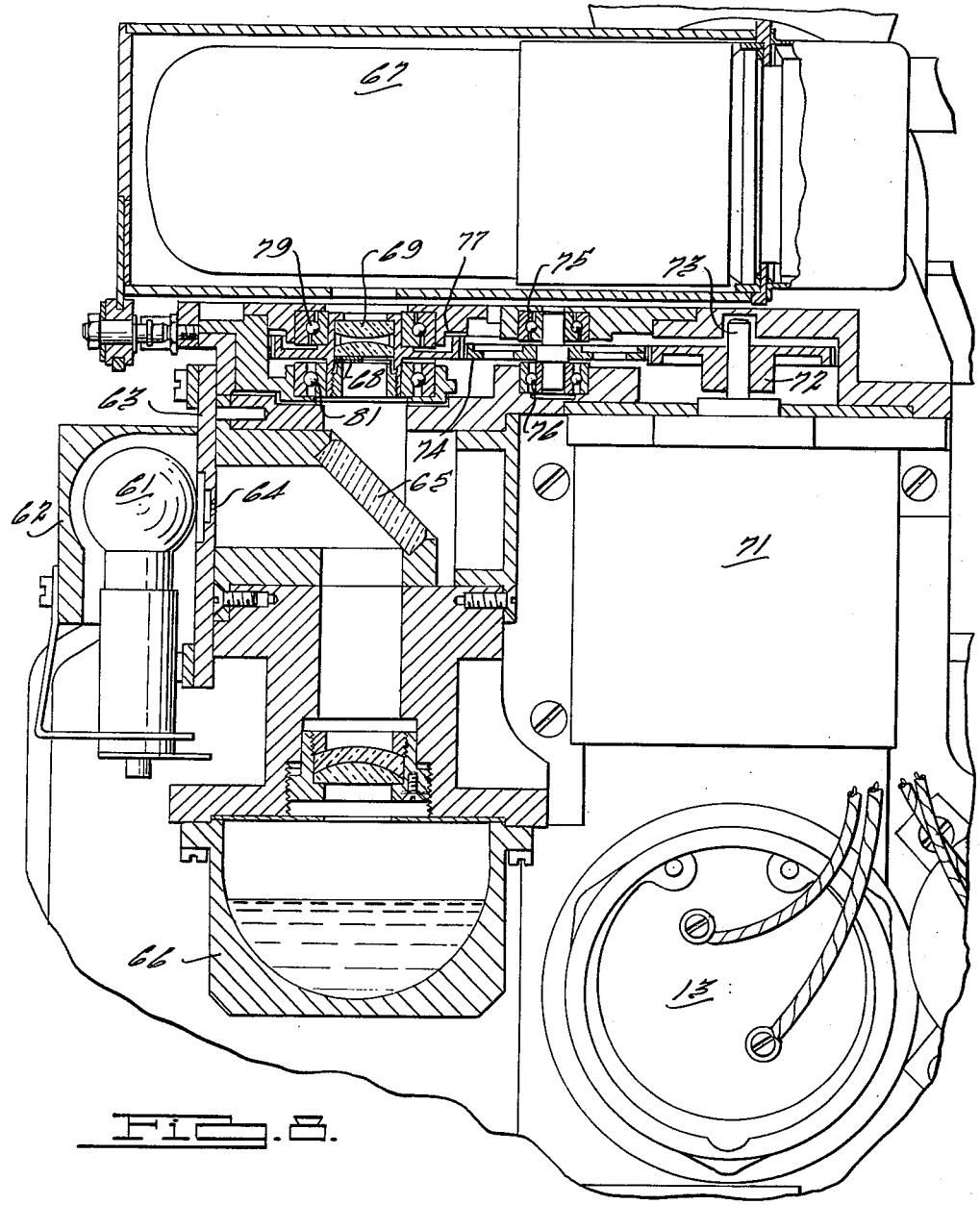
FIGURE 8 is a vertical sectional view of the horizontal reference taken along the line VIII—VIII of FIGURE 4.

In FIGURE 8 is shown in cross-section the artificial horizontal reference of the automatic navigator. This artificial horizontal reference is mounted on frame 14 which is carried by shaft 47 rotatably mounted in bearings 45 and 46 within the hollow shaft 44 at the left of the instrument as viewed in FIGURES 2, 4 and 5. The artificial horizontal reference herein is similar in operation to that disclosed in applicant's Patent No. 2,557,340 issued June 19, 1951.

As shown herein, the device includes a lamp 61 mounted within a lamp housing 62 which is provided with a closing plate 63 having a pin hole 64 therethrough. In the light path through the pin hole is a transparent-reflecting mirror 65 from which the light rays are reflected to the surface of a liquid within a liquid pool chamber 66. The beam of light is then reflected from the surface of the liquid pool back through the transparent-reflecting mirror 65 to a phototube 67 through a rotating shutter 68 and lens arrangement 69. The drive mechanism for the shutter 68 of the artificial horizontal reference is similar to that which has been previously described for driving the telescope shutters. It includes a horizontal reference shutter motor 71 having a drive gear 72 mounted on its shaft 73 with the drive gear 72 meshing with an idler gear 74 which is rotatably mounted in bearings 75 and 76 and meshes with a geared shutter holder 77 rotatably mounted in suitable bearings 79 and 81 and carrying the shutter 68.

The hour angle plate 35 is rotated through the hour angle gear 3 mounted thereon and meshed with a pinion driven by a motor 83 mounted on the frame 4 as shown more particularly in FIGURES 2 and 6. A self-synchronous motor used as a transmitter at 84 is also mounted on the frame 4 and has its rotor driven by a pinion meshing with the hour angle gear 3.

In FIGURE 9 is shown the amplifier circuit and the phototube which produces the input for the amplifier circuit which energizes the restoring motors, such as 12 and 24, mounted in quadrature. For the sake of example, the component parts of the amplifier circuit will be explained as associated with the Polaris telescope 1; however, it will be readily understood that similar amplifier circuits are associated with both the horizontal reference light sensitive circuit and the Capella telescope. In the representative system of FIGURE 9 there is shown the telescope system 1, the shutter drive motor 53 driving the shutter holder 41, the lens system 43, and the phototube 102. A suitable amplifier circuit 103 containing the necessary filtering circuits and electronic amplifier tubes is provided with a final amplifying stage 111 driving a resonant circuit containing one field winding, 112 and 113, of each of the controlled motors 12 and 24. The motors 12 and 24 have their other windings 114 and 115 energized from a supply voltage 116, one being energized directly from the supply and the other energized by the supply voltage shifted approximately 90 electrical degrees by the effect of a capacitor 117 connected in series therewith. The operation of this circuit is more fully described in the aforesaid Patent No. 2,713,134. Shown in FIGURE 10 is one form of shutter used in the present invention which consists of a disc of transparent material blacked out across one half of its surface so as to present a semi-circle of transparent material and a semi-circle of opaque material to interrupt the light beam so as to produce a time-phase signal from the phototube which is an indication of the orientation of the telescope with relation to its associated star.

More specifically, motor 53 rotates by means of a gear 200 and shutter holder 41 through engagement of their teeth at 201, and a shutter 42 of the kind shown in FIGURE 10 located at the center of holder 41.

The speed of motor 53 is maintained at a desired constant value. The light coming from the light source impinges on a lens 202 by which it is focused approximately on the plane of shutter 42 or shutter holder 41. The light beam emerging from shutter 42 is passed through lens system 43 to be focused again on the cathode or light sensitive electrode 204 of photo-multiplier tube 102.

This signal is considerably amplified at the output of photo-multiplier tube 102 which is operated in a well-known conventional manner and is applied through by-pass capacitor 205 to R-C coupled amplifier 103 consisting of two stages in cascade, namely stage 206 and stage 207.

The correct filtered output where the filtering occurs in network 210 is applied to the power amplifier tube 111 which has at its plate a circuit consisting of coils 112 and 113 in series connected between the plate 212 of tube 111 and the B+ supply shunted by capacitor 214.

Coils 113 and 112 are the coils for restoring motors 12 and 24 which have another set of coils, namely 115 and 114, respectively, connected essentially in parallel to an A.C. supply 116 having a certain preselected frequency.

Actually, coil 115 is in series with the phase changing capacitance 117 and the series combination is connected in parallel to coil 114 and then connected to the A.C. supply 116.

It is now possible to describe the operation of the circuit shown in FIGURE 9.

If the light beam coming from lens 202 is perfectly centered on shutter 42, then at all times half of the circular pattern produced by the light beam on shutter 42 will pass through the shutter and reach the electron emissive electrode 204 and produce, therefore, a continuous or constant signal which will not reach amplifier 103 because of the existence of blocking capacitor 205.

When, on the other hand, the beam coming from lens 202 is focused away from the center of shutter 42 but within the limited region covered by shutter 42, then the beam will be cut for every half revolution of shutter 42 and pass through shutter 42 at the other half of the rotation of shutter 42. Thus, an A.C. signal is produced which is properly amplified by amplifier system 103 and power amplifier 111 to be finally applied to coils 112 and 113 of motors 12 and 24.

It is necessary to point out that the function of capacitance 117 connected in series with coil 115 is to produce a phase shift between the currents flowing in windings 114 and 115 or, in other words, capacitance 117 serves to advance the current flowing through winding 115 of restoring motor 12 by approximately 90° with respect to the current flowing through winding 114 of the other restoring motor 24.

Motors 12 and 24 will operate, therefore, only when the current flowing in their field coils, namely field coils 113 and 112, respectively, has a definite phase relationship with the current flowing in coils 115 and 114 as is well-known in the art, but the phase angle of the currents flowing through coils 112 and 113 is a function of the angular position of the focusing point of the light beam coming from lens 202 with respect to the horizontal as shown, for example, in FIGURE 10 since the phase angle will depend on the particular point, angularly speaking, at which the light beam is cut off whether, for example, the light beam is cut off as soon as the dark portion of shutter 42 starts rotating in the upper half plane or whether the beam is cut off during one cycle after the dark or shaded portion of shutter 42 has already rotated from the position shown in FIGURE 10 by a certain number of degrees.

Consequently, motors 12 and 24 will rotate only when the beam is not centered on shutter 42, and the amount of rotation of motors 12 and 24 will be a function of the angular position of the focus of light beam from lens 202 on shutter 42.

In FIGURE 11 is schematically shown the means by which the movements of the various gears and transmitter may be combined in order to give an indication of longitude. The hour angle transmitter 84 is shown meshed with the hour angle gear 3 so that the hour angle selsyn transmits to the repeater 85 an indication of the position of the hour angle gear 3. A condition of unbalance in the hour angle repeater 85 is transferred to an amplifier 86 which energizes the field windings of a balancing motor 87 which rotates in a direction to restore balance to the repeater 85 and also moves the counter mechanism of the longitude counter 88. Also incorporated into the longitude counter mechanism schematically shown in FIGURE 11 is a clock 89 which is connected to the rotor of the hour angle repeater 85 through suitable gearing mechanism so that the longitude indication will be corrected for the Greenwich hour angle of the vernal equinox thereby making the indication of the longitude counter 88 an indication of true longitude.

In FIGURE 12 is shown a latitude counter mechanism for the instrument which derives an indication from the position of the horizontal reference transmitter 80 positioned by the horizontal reference motor 13. The horizontal reference transmitter 80 transmits to the horizontal reference repeater 91 an indication of the rotation of the horizontal reference motor 13 occasioned by movement of frame 14, by movement of sector 7, or by both. Any unbalance in the horizontal reference repeater 91 is applied to the amplifier 92 which energizes the motor 93 to rotate the rotor of the repeater in a direction to restore electrical balance to the repeater. Motor 93 also positions latitude counter mechanism 94.

Figure 3:
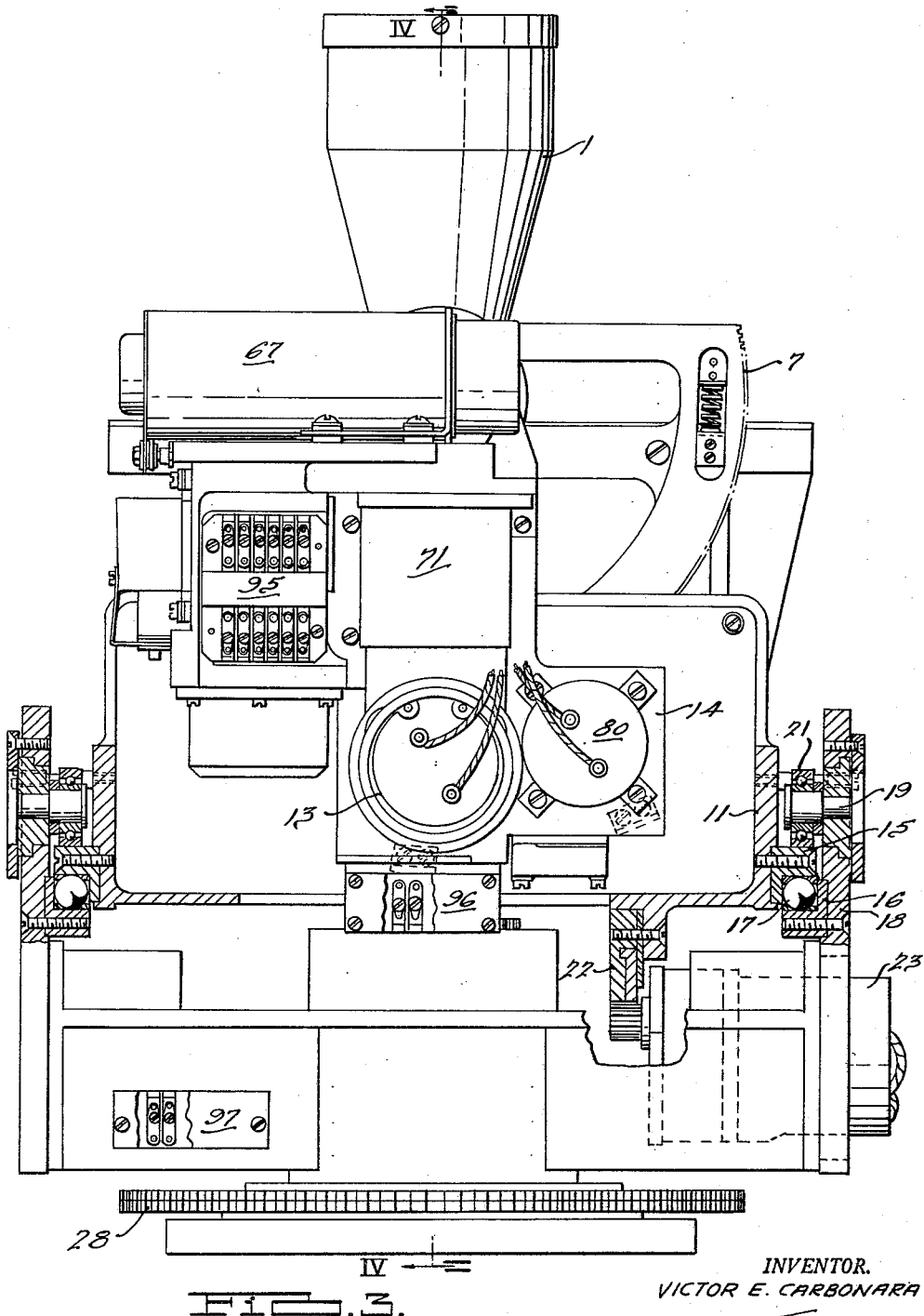
FIGURE 3 is an elevational view from the left of FIGURE 2, with parts shown in section.

The interconnecting electrical wiring which would be obviously necessary in the operation of the device of the present invention has not been shown, but it is believed to be readily apparent that such wiring could be connected through terminal boards as are shown in FIGURE 3 at 95, 96 and 97. It is further understood that interconnection between the moving parts of this present device and any remotely associated parts may be made through suitable slip ring connections, not shown.

The axis of the Polaris telescope is made perpendicular to the plate 35 for uniformity and ease of manufacture and deviation of Polaris from true North is optically compensated by the deviating prism 101. The axis of the optical path of the Capella telescope is related to the plate 35 and the Polaris telescope 1 so as to be directed toward the position of Capella in the celestial sphere and a reflecting mirror 104 is mounted within the telescope 2 so as to direct the light rays through the shutter 32 to the phototube 102.

*Operation*

In this description of the operation of the present invention, the two stars upon which continuous tracking will be maintained are selected as Polaris and Capella. With the telescope 1 directed at Polaris, the rays of light therefrom are deviated through the prism 101, and directed onto the cathode of the phototube 102 so that a time-phase signal will be produced in accordance with the alignment of the resultant optical axis of the telescope and Polaris. The signal produced by the phototube 102 is applied to the amplifier circuit 103 to energize the motors 12 and 24. The operation of the shutter motor, the shutter, the phototube, the amplifier stages, and two phase energization of the field windings of the two restoring motors in accordance with the position and time phase interruption of the light beam by the shutter is fully described in the aforesaid Patent No. 2,713,134. The two motors which are energized by the alignment of telescope 1 on the star Polaris are the azimuth motor 24 which rotates the entire device about an axis normal to the mounting plate 29 until the telescope is pointing north and the elevation motor 12 which rotates the frame 4 about the axis through shafts 44 to align telescope 1 for the proper elevation of Polaris. With telescope 1 aligned on Polaris, the device has now been adjusted so that an indication is provided of true north and so that the plane of the hour angle gear 3 has been aligned in parallel with the equinoctial. The telescope 2 is now directed toward the star Capella and the light rays from the star Capella are passed through the lens of the telescope, reflected from the reflecting mirror 104 and directed through the associated shutter 32 and lens system 43 onto the cathode of the associated phototube 102 which energizes an associated motor actuating amplifier 103 as has been previously described in connection with the Polaris telescope. The output of this amplifier is used to actuate the north-south axis motor 23 to rotate the cradle 11 by moving the race 15 relative to the race 16 about an axis normal to the axis through the shaft 44 and corresponding to the axis of development of the races, until the device is adjusted to the proper elevation of Capella to indirectly cause the alignment of the telescopes for the proper hour angle.

The artificial horizontal reference produces its own beam of light from source 61 through aperture 64 and has this reflected from the surface of the liquid pool in the chamber 66 through a lens, shutter and phototube arrangement similar to that previously described in connection with the two telescope circuits. A third amplifier circuit 103 is associated with the horizontal reference phototube to produce two motor actuating voltages which actuate the horizontal reference motor 13 and the hour angle motor 83 to return the artificial horizontal reference into coincidence with the local vertical, the action of motor 13 about the axis of shaft 47 being direct, while the action of motor 83 operates directly to rotate the hour angle gear 3 and only indirectly upon the horizontal reference through the resulting response of motor 23 caused by the deviation of Capella from its correct alignment caused by the rotation of the hour angle gear 3 and the plate 35.

As an example of the operation of the device here shown, assuming a change in latitude by travel along any of the meridians after the two telescopes have been aligned with their proper stars, this change in latitude will be accompanied by energization of the motor 12 to effect rotation of the frame 4 about the axis of the shafts 44 to change the elevation angle of telescope 1 to maintain it in alignment with Polaris. Rotation of frame 4 is accompanied by rotation of sector 7 which is meshed with the pinion driven by the hour angle motor 13. Rotation of the sector 7 is therefore accompanied by rotation of the frame 14 and the horizontal reference mounted thereon so that the surface of the liquid in chamber 66 is tilted with respect to the path of the light beam directed thereon. This tilting and resultant deviation of the light beam from the center of the associated shutter 68 affects energization of the motor 13 only to rotate the frame 14 about shafts 47 until the surface of the liquid is again normal to the light path directed to and reflected therefrom. Since the tilt of the liquid surface is about an axis parallel to the shaft 47, only the motor 13 is energized for restoration. Motor 13 also rotates the transmitter 80 to effect an unbalance in the repeater 91 which is connected by motor 93 with consequent change in the latitude counter 94.

A change in longitude only of the instrument after orientation causes a deviation in azimuth between the axes of the telescopes and the stars which they seek. This will effect energization of the motor 24 to rotate the device bodily about an axis normal to the mounting plate 29 to align the telescope 1 with Polaris. This rotation causes telescope 2 to deviate from the alignment with Capella so that motor 23 is energized to rotate the cradle 11 about the north-south axis at right angles to the axis through shaft 44. This rotation of cradle 11 also rotates the frame 14 and the horizontal reference mounted thereon about the north-south axis so that the surface of the liquid in chamber 66 is tilted with respect to the light beam directed thereon. This deviation of the horizontal reference affects energization of the motor 83 to rotate the hour angle gear 3 and the plate 35 on which it is mounted. Rotation of the cradle 11 about the north-south axis also tends to cause telescope 1 to deviate from alignment with Polaris which affects energization of its motors to restore it to alignment. The restoring action of the motors 12, 23, 24 and 83 continue in this inter-related manner to maintain the telescopes 1 and 2 in alignment with Polaris and Capella and the surface of the liquid in chamber 66 normal to the light beam directed to and reflected therefrom. The rotation of the hour angle gear 3 resulting from the above movements causes rotation of the transmitter 84 to effect an electrical unbalance in the repeater 85 so that the motor 87 is energized to restore the electrical balance to the repeaters. The sidereal clock 89 is also changing the electrical balance of the repeater 85 and the resultant is reflected in true longitude at the counter 88.

It will be understood that the movements and corrections described in the above explanation of the effect of movement in either longitude or latitude or both are not individual in nature and that the motors of the device are in continuous operation while the device is being moved to maintain the telescopes in alignment with their preselected points of reference and the liquid surface in the horizontal reference in alignment with the local horizontal.

The operation of the Capella telescope when the air or sea craft upon which it is mounted is not moving is to follow the star Capella around its diurnal path and to introduce a correction for the Greenwich hour angle of the vernal equinox so as to retain a constant indication of longitude. This is accomplished through the use of the differential repeater selsyn shown at 85 in FIGURE 11, the stator of which is energized by the hour angle selsyn 84 and the rotor of which is rotated by the clock mechanism 89. When the craft on which the instrument is mounted is moving in the same direction as the sun, the stator of the differential hour angle repeater 85 is energized to indicate the proper movement of the Capella telescope 2. The rotor of the differential repeater 85 is physically moved by clock mechanism 89 to develop an effective motion between the stator and rotor which produces an unbalance in the repeater. This unbalance when applied to the amplifier 86 energizes the motor 87 to rotate the housing of the repeater 85 to bring the repeater 85 to an electrical balance and to move the longitude counter mechanism to indicate the change in longitude.

When the craft is moving in an easterly direction, the movement of the Capella telescope 2 caused by the movement of the craft is added to the movement caused by the travel of the star in its diurnal path so as to electrically move the energization of the stator of the repeater 85 a greater distance than the mechanical movement of the rotor caused by the clock 89. Again the unbalance is applied to the amplifier 86 and the motor 87 is thereby energized to rotate the housing of the repeater 85 to return the repeater 85 to balance and to move the longitude counter mechanism 88 to indicate the decrease in longitude.

It will thus be seen that the Polaris telescope in co-operation with the means leveling the axis of shafts 44 causes true alignment of the automatic navigator; that the Capella telescope brings in compensations for rotation of the earth within the celestial sphere; and that the artificial horizontal reference section corrects for movement of the craft upon the surface of the earth, the resulting indications and responses reflecting the true latitude and longitude of the instrument.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In an automatic navigator, a support having three mutually perpendicular axes of rotation, means mounting said support for rotation about a fourth axis, a plurality of telescopes mounted on said support in fixed angular relationship, said angular relationship being predetermined so that said telescopes are directable toward preselected celestial points of reference, radiant energy responsive means associated with said telescopes, means energized by said radiant energy responsive means for positioning said support about said mutually perpendicular axes, means providing a horizontal reference, means for positioning said horizontal reference into coincidence with the local horizontal, means responsive to deviation of said reference from the horizontal for energizing said reference positioning means, means for rotating said support about said fourth axis, and means for energizing said last mentioned means from said deviation responsive means.

2. In an automatic navigator, a support having three mutually perpendicular axes of rotation, means mounting said support for rotation about a fourth axis, a plurality of telescopes mounted on said support in fixed angular relationship, said angular relationship being predetermined so that said telescopes are directable toward preselected celestial points of reference, radiant energy responsive means associated with said telescopes, means energized by said radiant energy responsive means for positioning said support about said mutually perpendicular axes with said fourth axis at right angles to the plane of the celestial equator, means providing a horizontal reference, means for positioning said horizontal reference into coincidence with the local horizontal, means responsive to deviation of said reference from the horizontal for energizing said reference positioning means and for rotating said support about said fourth axis, and means for continuously and automatically indicating the relationship between the local horizontal and said fourth axis to derive the latitude of the navigator.

3. In an automatic navigator, a support having three mutually perpendicular axes of rotation, means mounting said support for rotation about a fourth axis, a plurality of telescopes mounted on said support in fixed angular relationship, said angular relationship being predetermined so that said telescopes are directable toward preselected celestial points of reference, radiant energy responsive means associated with said telescopes, means energized by said radiant energy responsive means for positioning said support about said mutually perpendicular axes with said fourth axis at right angles to the plane of the celestial equator, means providing a horizontal reference, means for positioning said horizontal reference into coincidence with the local horizontal, means responsive to deviation of said reference from the horizontal for energizing said reference positioning means and for rotating said support about said fourth axis, means providing Greenwich sidereal time, and means for continuously and automatically indicating the comparison of the angular rotation of said support about said fourth axis with Greenwich sidereal time to derive the longitude of the navigator.

4. In an automatic navigator, a support having three mutually perpendicular axes of rotation, means mounting said support for rotation about a fourth axis, a plurality of telescopes mounted on said support in fixed angular relationship, said angular relationship being predetermined so that said telescopes are directable toward preselected celestial points of reference, radiant energy responsive means associated with said telescopes, means energized by said radiant energy responsive means for positioning said support about said mutually perpendicular axes with said fourth axis perpendicular to the plane of the celestial equator, means providing a horizontal reference, means for positioning said horizontal reference into coincidence with the local horizontal, means responsive to deviation of said reference from the horizontal for energizing said reference positioning means, means for rotating said support about said fourth axis of rotation, means for energizing said last mentioned means from said deviation responsive means, means providing Greenwich sidereal time, means for continuously and automatically combining the angular rotation of said support about said fourth axis with Greenwich sidereal time to provide an indication of the longitude of the navigator, and means for continuously and automatically indicating the relationship between the local horizontal and said fourth axis to indicate the latitude of the navigator.

References Cited in the file of this patent

UNITED STATES PATENTS

| | | |
|---|---|---|
| 2,007,398 | Clark | Apr. 20, 1937 |
| 2,102,587 | Eliel | Dec. 21, 1937 |
| 2,155,402 | Clark | Apr. 25, 1939 |
| 2,444,933 | Hasperson | July 13, 1948 |
| 2,462,925 | Varian | Mar. 1, 1949 |
| 2,471,686 | Hiltner | May 31, 1949 |
| 2,492,148 | Herbold | Dec. 27, 1949 |
| 2,513,367 | Scott | July 4, 1950 |
| 2,532,402 | Herbold | Dec. 5, 1950 |

FOREIGN PATENTS

| | | |
|---|---|---|
| 105,371 | Great Britain | Apr. 5, 1917 |
| 33,746 | Netherlands | Oct. 15, 1934 |